United States Patent Office 2,990,386
Patented June 27, 1961

2,990,386
LIQUID COATING COMPOSITION COMPRISING A SUSPENSION OF A LIQUID COATING COMPONENT IN NITROMETHANE
Charles F. Roney, Hammond, Ind., assignor to Bee Chemical Company, Chicago, Ill., a corporation of Illinois
No Drawing. Filed Dec. 31, 1956, Ser. No. 631,408
10 Claims. (Cl. 260—23)

The invention relates to coating compositions and methods of preparing such compositions.

More particularly, the invention is concerned with organic liquid coating compositions which are dispersions of one organic liquid in another immiscible organic liquid. The invention has particular application to the production of multicolor coating compositions.

Heretofore coating compositions have been made which are dispersions of an organic liquid coating composition in an aqueous medium and in some instances the aqueous medium is dispersed in the organic liquid. Such coating compositions in which the dispersed particles are of visible size have found particular commercial usefulness in the production of multicolor or mottled coatings. Practically all such multicolor coating compositions are organic lacquers dispersed in water and the only ones which have found any substantial commercial usefulness are those in which a nitrocellulose lacquer is dispersed in water with methyl cellulose or similar material as the protective colloid.

All these multicolor aqueous systems have many shortcomings, including the following:

(1) Poor adhesion to non-porous surfaces and particularly metals and plastics;
(2) Blush and poor drying in humid weather;
(3) Corrosion problems of containers; and
(4) Highly flammable painted surfaces.

An object of this invention is to provide a coating composition suitable for multicolor finishes which overcomes the above disadvantages.

A further object of my invention is to provide coating compositions which can be applied in a single coat to non-porous as well as porous surfaces, to form adherent, hard, sound, non-peeling films of the coating material.

A still further and important object of my invention is to provide non-aqueous coating compositions which contain discrete particles or globules of two or more coating materials of different colors or shades and which can be applied to various types of surfaces to produce by a single application of the composition unique finishes and effects, such as multicolor finishes in which the different colors or shades of the particles remain distinguishable after the coating film has hardened.

Another object of my invention is the production of a dispersion of a complete coating material such as a paint, lacquer, varnish or enamel in the form of relatively large particles or globules of controlled size in an organic liquid medium, using a water insoluble suspension stabilizer to provide improved adhesion, the majority of the dispersed particles being larger than about 50 microns in size and preferably being large enough to appear both in the dispersion and after application as discrete particles visible to the naked eye.

In accordance with the invention an organic liquid soluble protective colloid is used to provide a coating composition which is a stable dispersion of an organic liquid in another organic liquid, the organic liquids being incompatible with each other, and one of the organic liquids being a coating material such as a lacquer, enamel or paint.

The protective colloid is one which has the property of being soluble in the outer or disperse phase of the dispersion, and preferably substantially insoluble in the inner or dispersed phase; and for improved water resistance, also substantially insoluble in water.

The best coating compositions for accomplishing the objects of the invention are those having nitromethane as the outer phase and having a coating material including pigment as the inner phase.

The coating composition consists essentially of a dispersion of relatively large particles of the organic liquid coating material in the nitromethane. The coating material is preferably a complete coating material in itself such as a lacquer, enamel, paint, varnish, or the like, prepared with a hydrocarbon liquid. The nitromethane dispersing medium preferably is not particularly viscous in character but contains just a sufficient amount of a stabilizing agent to maintain the dispersed particles of coating material as discrete particles without appreciable coalescence. By "relatively large particles" of dispersed coating material I mean particles the majority of which are at least 50 microns in size, it being recognized that all of the particles will not necessarily be of the same size but may range from a few particles less than 50 microns in size up to some particles which may even exceed 4000 microns in size. In other words, the dominant sizes of dispersed particles, or those sizes occurring most frequently in the dispersions, should be larger than 50 microns, and to obtain special texture and multi-color effects, a substantial portion of the dispersed particles should be larger than 300 microns in size.

It is highly desirable that specific gravity of the inner or dispersed phase be nearly equal to the outer or disperse phase. This gives a very stable system. If the gravity of the inner phase is greater than the outer phase by a large amount, the dispersed particles settle to the bottom and are likely to flocculate. In some systems the floccules will break up satisfactorily but shelf life may be limited. If the inner phase is much lighter than the outer phase, the dispersed particles will float and again flocculation will take place. However, flocculation is not so likely to occur as when the inner phase is heavier than the outer phase and the time in which it will occur is much longer.

Other incompatible organic liquids can be used besides nitromethane and hydrocarbons. These all had disadvantages over the nitromethane hydrocarbon system. In the case of an alcohol outer phase and a naphtha inner phase it is practically impossible to match gravities. The inner phase coating the pigment will always be heavier and the dispersed particles will sink. However, by shaking one can redisperse the naphtha phase and this is usable. Poor results are also obtained with an alcohol inner phase and a naphtha outer phase, and also with a naphtha outer phase and a nitromethane inner phase.

With a naphtha or similar light hydrocarbon inner phase and a nitromethane outer phase an ideal condition exists. The naphtha is sufficiently lighter than the nitromethane that it will float. This itself is highly desirable and the gravities are such that the naphtha inner phase can be loaded with pigments to match the gravity of the nitromethane outer phase. With this system much more pigment can be used to obtain equal gravity than with the aqueous system, thus obtaining better hiding power.

The liquid of the inner or dispersed phase is suitably any organic liquid which is incompatible with the organic liquid of the outer phase. When nitromethane is the outer phase a suitable organic liquid is any aliphatic hydrocarbon or mixture of said hydrocarbons. Aromatic hydrocarbons such as benzol, toluol, or the like, may be used but preferably are mixed with a substantial proportion of aliphatic hydrocarbons, particularly when nitromethane is used as an outer phase.

Suitable aliphatic hydrocarbons include those boiling from approximately 30° C. to 250° C. and preferably from 65° C. to 150° C. These include pentane, hexane, decane, dodecane and mixtures thereof. Naphthas and mineral spirits are mixtures of hydrocarbon compounds which are suitable.

Highly satisfactory results have also been obtained by dispersing drying oils, such as linseed oil and tung oil, or curing liquid resins which are incompatible with nitromethane, such as unsaturated liquid hydrocarbon resins in the nitromethane or like incompatible organic liquid.

Other outer phase organic liquids beside nitromethane can be used provided they are incompatible with the inner phase organic liquid, and likewise other inner phase liquids beside hydrocarbons and drying oils can be used, but in all such cases less satisfactory results have been obtained particularly due to difficulties in balancing viscosity and specific gravity. Operable but not equivalent coating compositions to those made with hydrocarbons and nitromethane were made with hydrocarbons, such as naphtha as the inner phase, and methanol, ethanol, dimethyl sulfoxide, carbon disulfide, pyrrole, and dimethyl formamide as the outer phase. As a generalization it can be said that operable systems can be made using a very non-polar liquid as one phase with a relatively polar liquid as the other phase, but that within this generalization the coating compositions can range from very inferior to superior.

The pigments are dispersed in the inner phase coating composition. The coating composition contains the liquid hydrocarbon solvent and a resin. Any resin which is soluble in an aliphatic hydrocarbon is suitable. These include the oil modified alkyds and various varnish resins. Alkyd resins which were found suitable included Cycopol 341-17 (a vinyl toluene oil modified alkyd (American Cyanamid)) and Syntex 115 (a 38% soya oil modified phthalic alkyd (Jones Dabney)). Another suitable alkyd resin is a 60% soya bean oil modified glyceryl phthalic anhydride condensation product. Syntex 115 is dissolved in a mixture of 95% aliphatic hydrocarbon with 5% aromatic hydrocarbon.

The suspension stabilizers are added to the outer phase organic liquid. Suitable suspension stabilizers are protective colloids which are soluble in the outer phase organic liquid such as for example soluble in nitromethane. Preferably the protective colloids should be insoluble in water to obtain improved characteristics of the coating. Suitable protective colloids are the colloidal resins such as the polyacrylic esters, cellulose esters such as cellulose acetate, cellulose acetate butyrate, cellulose acetate propionate, nitrocellulose, and vinyl polymers and copolymers such as vinyl acetate, copolymer of vinyl acetate and vinyl chloride, copolymer of styrene and maleic anhydride, copolymer of vinyl acetate and acrylic acid, which are soluble in the outer phase.

The following table gives some suspension stabilizers which have been found satisfactory for nitromethane outer phase systems:

TABLE I

| | Percent by weight in nitromethane |
|---|---|
| Isobutyl methacrylate resin | .5–40 |
| Ethyl acrylate resin | .5–40 |
| Cellulose acetate butyrate (38% butyrate 1% free hydroxy) | .5–30 |
| Nitrocellulose (CC ½ sec.) | .5–30 |
| Polyvinyl acetate | .5–40 |
| Copolymer of vinyl acetate and acrylic acid (Shawinigan Polymer C-3) | .5–40 |
| Styrene-maleic anhydride copolymer (Lustrex 820) | .5–40 |
| Cellulose acetate | .5–20 |

Control of the viscosity in the second phase organic liquid system is important. However, the viscosity in the outer phase is only of importance in that it effects the viscosity of the inner phase, although resins should be in the outer phase. They can be present in very little amount and the viscosity may be as low as the straight organic solvent. The viscosity of the inner phase should be greater than the outer phase in order to obtain stable dispersion of visible particle size. Experimentation indicates that it should be substantially greater for the best results. One reason for this is that the viscosity of the inner phase effects the particle size and as in the coating composition of the Zola Patent No. 2,591,904 the best results are obtained by having the majority of dispersed particles larger than about 50 microns in size. If the viscosity of the inner phase is low, near that of the outer phase, the inner phase will be very small approaching an emulsion. If the viscosity of the inner phase is extremely high relative to the outer phase it is difficult to obtain a system having discrete dispersed particles.

In the case where a lacquer such as a hydrocarbon solution of butadiene-styrene copolymer of 60% styrene, or natural rubber, or polybutadiene is the inner phase, with nitromethane as the outer phase viscosity control is only a matter of controlling the percent solids. In this case where an enamel such as alkyd and varnish resin in the hydrocarbon is the inner phase it is advisable to increase the viscosity not only by means of increasing the solid content but by adding so-called puffing agents. The most successful puffing agents were the large soaps such as aluminum stearate, aluminum octylate; platelets, and other particles which are capable of orientation to form solvent gels such as Bentone 34 (dibenzyl diethyl ammonium bentonite (National Lead)) and Thixin (castor oil gel (Baker Castor Oil)); trivalent metal alkoxides such as alkoxide of octyl alcohol and aluminum.

The following examples are given to illustrate the invention:

*Example 1*

The first system prepared was a lacquer having a nitromethane inner phase and a hydrocarbon outer phase, and was as follows:

| | Parts by weight |
|---|---|
| Inner phase: | |
| Pigment titanium dioxide | 10.0 |
| Cellulose Acetate Butyrate 50% butyrate 2 Sec. | 75.0 |
| Poly isobutyl methacrylate | 62.5 |
| Nitromethane | 225.0 |
| | 372.5 |
| Outer phase: | |
| Cycopol 341-17 (vinyl toluene modified alkyd) | 100 |
| Hexane | 150 |
| | 250 |

The above formula gave a good quality multicolor composition but had poor can stability.

*Example 2*

[Lacquer having a hydrocarbon inner phase and a nitromethane outer phase]

| | Parts by weight |
|---|---|
| Inner phase: | |
| Pigment TiO$_2$ | 10.0 |
| Butadiene styrene copolymer 60% styrene | 40. |
| Toluene | 25 |
| Heptane | 25 |
| | 100 |
| Outer phase: | |
| Cellulose acetate butyrate 38% butyrate | 55 |
| Nitromethane | 200 |
| | 255 |

The inner and outer phases were compounded separately and then the two phases were mixed together with mild agitation for five minutes. The lacquer coating composition produced was stable.

Other compositions were made up using different colored pigments and then blended together to produce a stable multicolor lacquer having the pigmented hydrocarbon phase as stable visible size particles (300 microns). This multicolor lacquer adhered very well to polymethacrylate and other plastics.

Example 3 (Enamel)

The next system prepared was an enamel inner phase with a nitromethane outer phase.

Inner phase:                                        Parts by weight
- Pigment (Iron red) _____ 17.50
- Cobalt naphthenate _____ 0.35
- Vinyl toluene alkyd Cycopol 341-17 ____ 46.40
- Aluminum stearate _____ 3.25
- Hexane _____ 32.50

100.00

Outer phase:
- Isobutyl methacrylate _____ 50
- Nitromethane _____ 200

250

In the above system the inner phase and the outer phase are nearly equal in gravity. The inner phase was prepared in three colors, in which the pigments were titanium dioxide, ultramarine blue, and iron red. It was found that the best results are obtained if the three colors are prepared individually and allowed to age for a day or two before mixing the final multicolor system. This system has shown exceptional can stability, being still stable after two months. Identical systems were prepared using ½" butyrate and SS ½" nitrocellulose in place of the methacrylate in the outer phase with practically the same results.

Example 4

Another system which was prepared used ethyl cellulose in methanol as the outer phase based on the same composition as the second system prepared. This system settles rapidly but is still stable after two weeks and is usable by shaking it before use.

Example 5

The fifth system prepared was a baking enamel inner phase and nitromethane outer phase:

Inner phase:                                        Parts by weight
- Pigment (Chrome yellow) _____ 17.5
- Cobalt naphthenate _____ 0.35
- Syntex 115 (38% soya oil phthalic anhydride alkyd) _____ 46.4
- Alkoxide of octyl alcohol and aluminum __ 3.25
- Mineral spirits _____ 32.5

100.00

Outer phase:
- Ethyl acrylate _____ 50
- Nitromethane _____ 200

250

This system was sprayed and air dried thirty minutes, then baked at 325° F. for thirty minutes. The system was very hard and tough and had excellent adhesion to steel. The can stability of this material is comparable to Example 2.

Example 6 (Paint)

The inner phase was first made having the following composition:

Inner Phase:                                        Parts by weight
- Titanium dioxide _____ 30.0
- Linseed oil _____ 100.0
- Lead naphthenate _____ 2.0
- Cobalt naphthenate _____ 1.0
- Dibenzyl dimethyl bentonite (Bentone 34) __ 5.0

138.0

Outer Phase:
- Nitromethane _____ 250
- Polyvinyl acetate _____ 50

300

The two phases were mixed together and given mild agitation for five minutes. This gave systems of visible discrete particles of the pigmented linseed oil in the nitromethane. Other color dispersions were made in the same way and all mixed together. The composition gave a highly satisfactory multicolor paint.

In all the above multicolor systems overagitation must be avoided in order not to obtain emulsions. Emulsion systems can be made, of course, for ordinary single color work but not for the mottled multicolor effect. The organic liquid system of this invention also has the advantage that after having been made and stored for a few hours it is more stable against violent agitation than the water systems. In my organic system there is no high amount of stabilizer which will produce emulsification per se, it only being important not to give too vigorous agitation.

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claims.

I claim:

1. A liquid coating composition for direct application to a surface as a protective and decorative coating which comprises discrete particles of a liquid coating component suspended in a liquid consisting essentially of nitromethane containing a nitromethane soluble protective colloid stabilizing agent, said liquid coating component comprising an organic liquid containing pigments, said organic liquid of the coating component being immiscible with the nitromethane, the majority of the discrete particles of the liquid coating component being larger than 50 microns in size and said suspended discrete particles remaining in suspension without appreciable coalescence upon shaking after standing for a substantial length of time.

2. The composition of claim 1 wherein the organic liquid of the liquid coating component is a hydrocarbon.

3. The composition of claim 1 wherein the organic liquid of the liquid coating component is a drying oil.

4. The composition of claim 1 wherein the organic liquid of the liquid coating component is a liquid resin.

5. The composition of claim 1 wherein the liquid coating component includes a film-forming resin soluble in the organic liquid of the coating composition.

6. The composition of claim 5 wherein the organic liquid is an aliphatic hydrocarbon and the resin is an alkyd resin soluble in said hydrocarbon.

7. The composition of claim 6 wherein the coating component contains a puffing agent selected from the group of aluminum soaps, bentonite gels, castor oil gels, and trivalent metal alkoxides.

8. The composition of claim 1 where the protective colloid stabilizing agent is selected from the group consisting of nitromethane soluble, vinyl resins and cellulose esters.

9. A liquid coating composition comprising discrete particles of a liquid coating enamel consisting essentially of a liquid aliphatic hydrocarbon, an inorganic pigment, and a vinyl toluene modified alkyd resin dissolved in the hydrocarbon the majority of the discrete particles of the liquid coating enamel being larger than 50 microns in size and, said discrete liquid particles being immiscible in and dispersed in a liquid consisting essentially of nitromethane containing polyisobutyl methacrylate dissolved therein, the polyisobutyl methacrylate being present in sufficient amount to maintain the dispersed particles of liquid coating enamel as discrete particles without appreciable coalescence.

10. The liquid coating composition of claim 9 in which the liquid aliphatic hydrocarbon is hexane.

References Cited in the file of this patent

UNITED STATES PATENTS

| | | |
|---|---|---|
| 2,091,466 | Busch | Aug. 31, 1937 |
| 2,337,635 | Bogin | Dec. 28, 1943 |
| 2,389,837 | Bogin | Nov. 27, 1945 |
| 2,591,904 | Zola | Apr. 8, 1952 |
| 2,794,791 | Patton et al. | June 4, 1957 |
| 2,795,562 | Jud | June 11, 1957 |
| 2,852,381 | Minsk et al. | Sept. 16, 1958 |

OTHER REFERENCES

Davis and Blake: Chemistry and Tech. of Rubber, page 669, Reinhold (1937).

Pollak: Paint, Oil and Chem. Rev. 109, No. 16, pp. 22, 24, 26 (1946).

Powell et al.: Organosols from Vinyl Resins, pages 94–108. Official Digest of Fed. of Paint and Var. Prod. Clubs, February 1954.

Whitby: Synthetic Rubber (page 625), John Wiley (1954).

Burrel: Organic Finishing, vol. 16, No. 12, pp. 15–20, 117–175 (December 1955).